May 20, 1969 — G. APITZ — 3,444,655
METHOD OF FORMING BEVEL GEARS
Filed Jan. 14, 1965

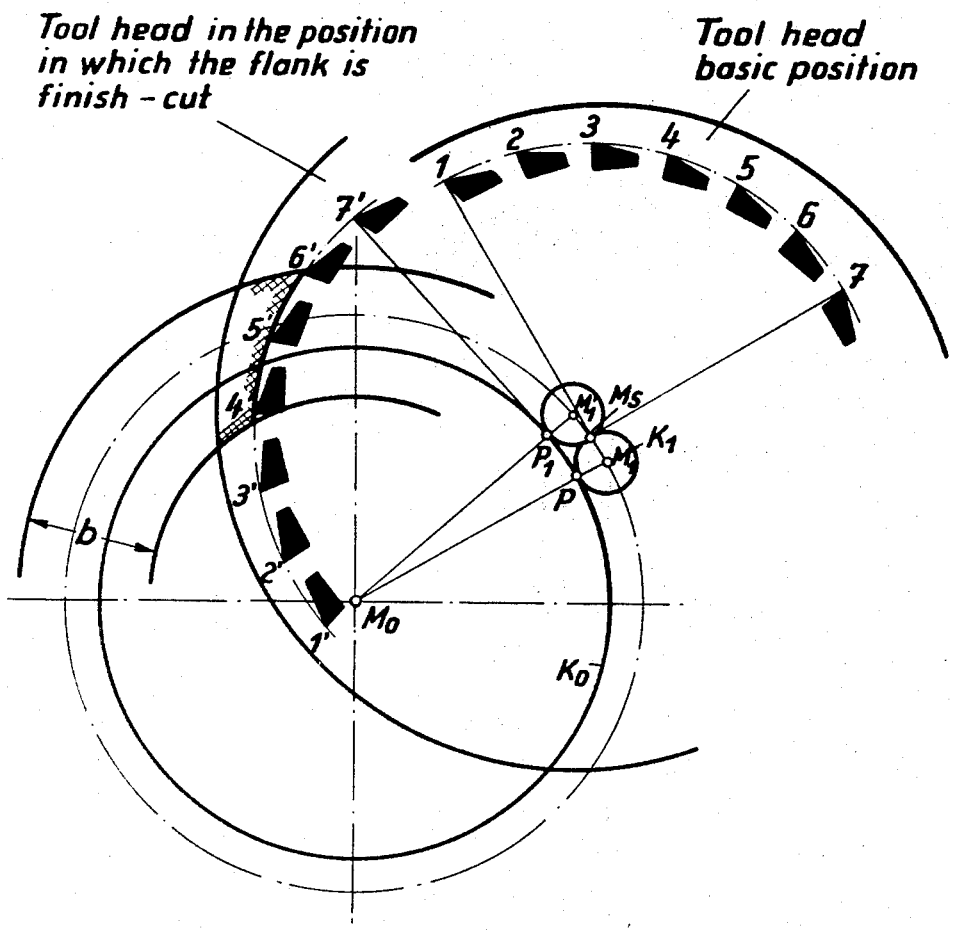

Fig. 18
a
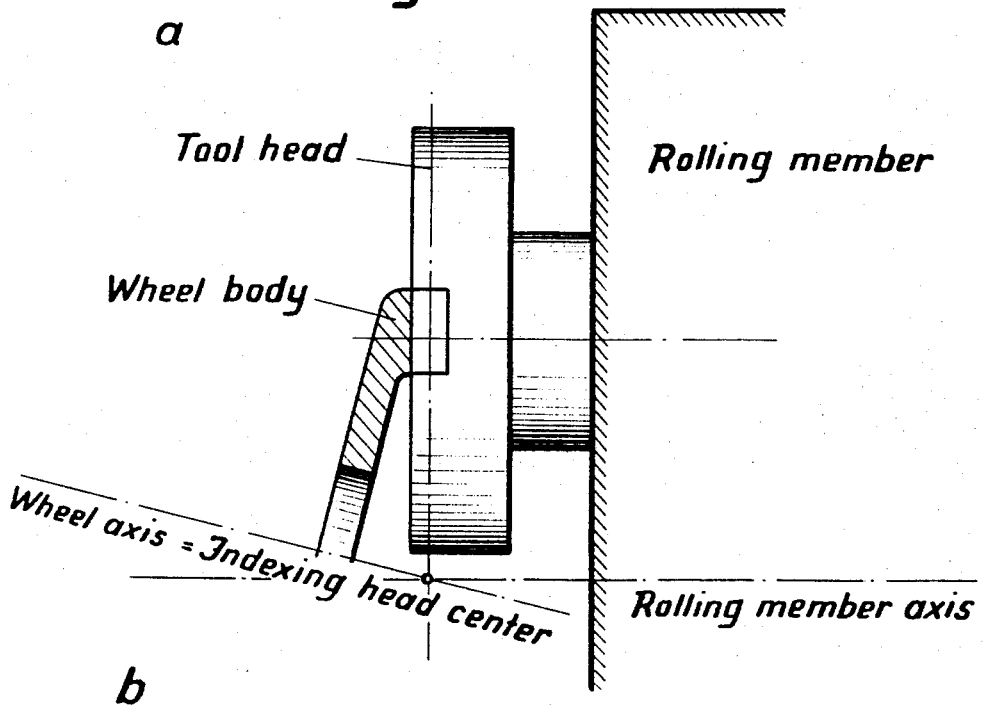
b
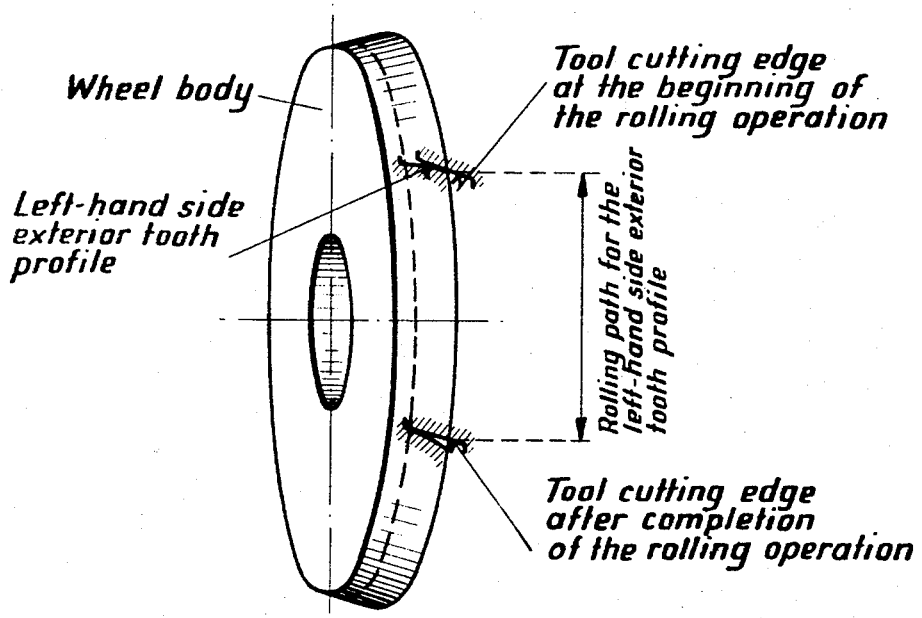

INVENTOR.
Gerhard Apitz
BY
Beaman Beaman $M_{O_1}$ = Center of the crown wheel of the pinion
$M_{O_2}$ = Center of the crown wheel of the spur bevel gear
$a$ = Displacement of axis United States Patent Office 3,444,655
Patented May 20, 1969

3,444,655
METHOD OF FORMING BEVEL GEARS
Gerhard Apitz, Hamburg, Germany, assignor to
Heidenreich & Harbeck, Hamburg, Germany
Filed Jan. 14, 1965, Ser. No. 425,561
Claims priority, application Germany, Jan. 15, 1964,
H 51,380
Int. Cl. B24b 1/00; B23f 9/10
U.S. Cl. 51—287                                    1 Claim

ABSTRACT OF THE DISCLOSURE

A method of forming bevel gears having arcuate teeth, wherein the gears are formed by either a milling or grinding operation, or both. The cutting edges of the machining edges being arranged in a circular configuration having a center eccentrically related to a first axis of rotation which orbits about a second axis of rotation such that the cutting edges are moved through an epicycloidal path, and a pair of machining edges being mounted upon the tool head wherein both flangs of a gear tooth are formed with one or fewer rotations of the tool head.

Bevel gears having arcuate teeth are known and, because they run with a lower noise level, they are preferred to straight-toothed and inclined-toothed bevel gears. There are various methods of producing these gears and they produce a different form of the tooth in each case. Gears which are milled by the indexing method generally have flank lines which are curved in circular arcs, while in the case of gears produced by the continuous milling method the flank lines extend in accordance with cycloids or modified involutes.

Hardened gears are lapped in sets after the hardening process and are also installed in sets. There is no possibility of exchange. The lapping times are dependent upon the dimensions of the gears (modulus, number of teeth and transmission ratio), but above all on the distortion due to hardening. With a favourable transmission ratio and very slight distortion due to hardening, lapping times of 6, 8 or 10 minutes can be obtained. On the other hand, with unfavourable ratios and greater distortion due to hardening, far longer lapping times are required. Manufacture which would permit exchange would be possible only in the case of ground tooth flanks. The grinding of arcuate teeth by the indexing method is known, but this method has not succeeded in becoming widespread in mass production because of the longer times required for grinding as compared with lapping.

The problem underlying the invention is to formulate a method by which arcuate teeth can be milled continuously and ground continuously, so that very short working times and complete exchangeability are obtained, without the necessity for a high degree of accuracy in installation. Moreover, convex bearing of the flanks longitudinally of the tooth is extremely advantageous from the point of view obtaining such insensitivity of installation.

Continuous grinding requires open grinding wheels (that is grinding segments), so that after a certain movement, for example a half revolution of the tool, the following grinding segment can engage in the next tooth space. At the same time, it must be possible for the grinding segments to be dressed satisfactorily and this is the best achieved with circular tools.

Figure 4:
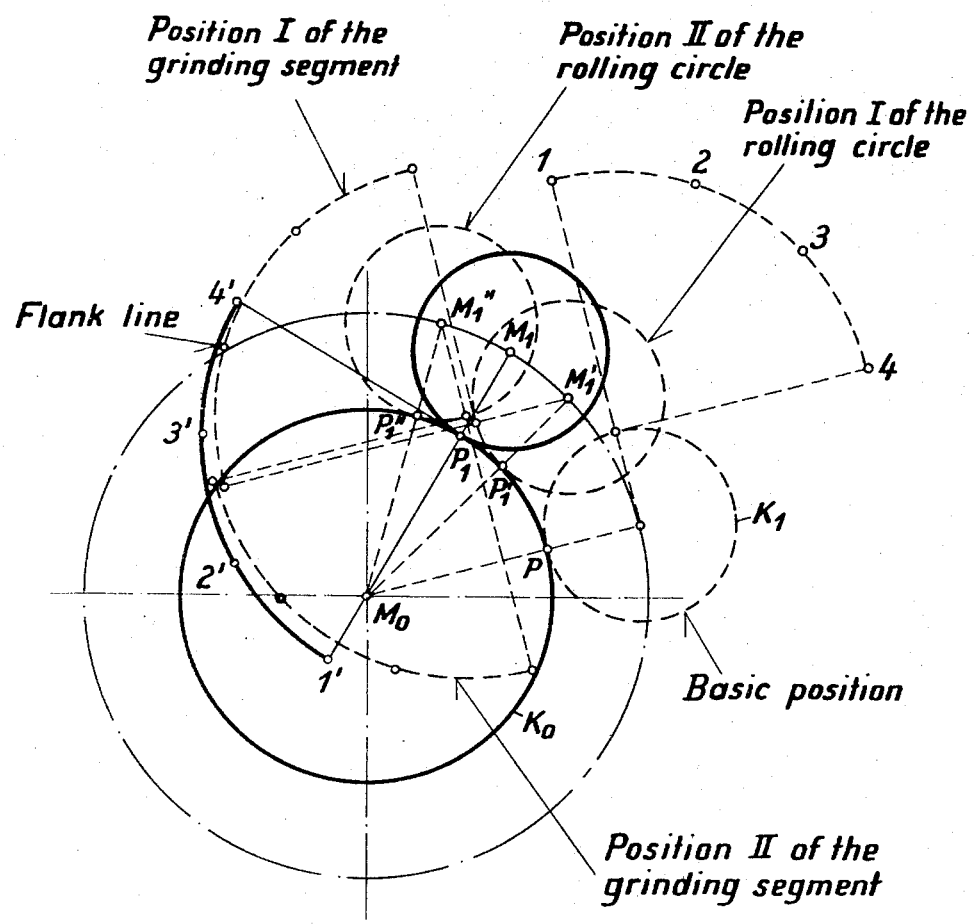
Figure 5:
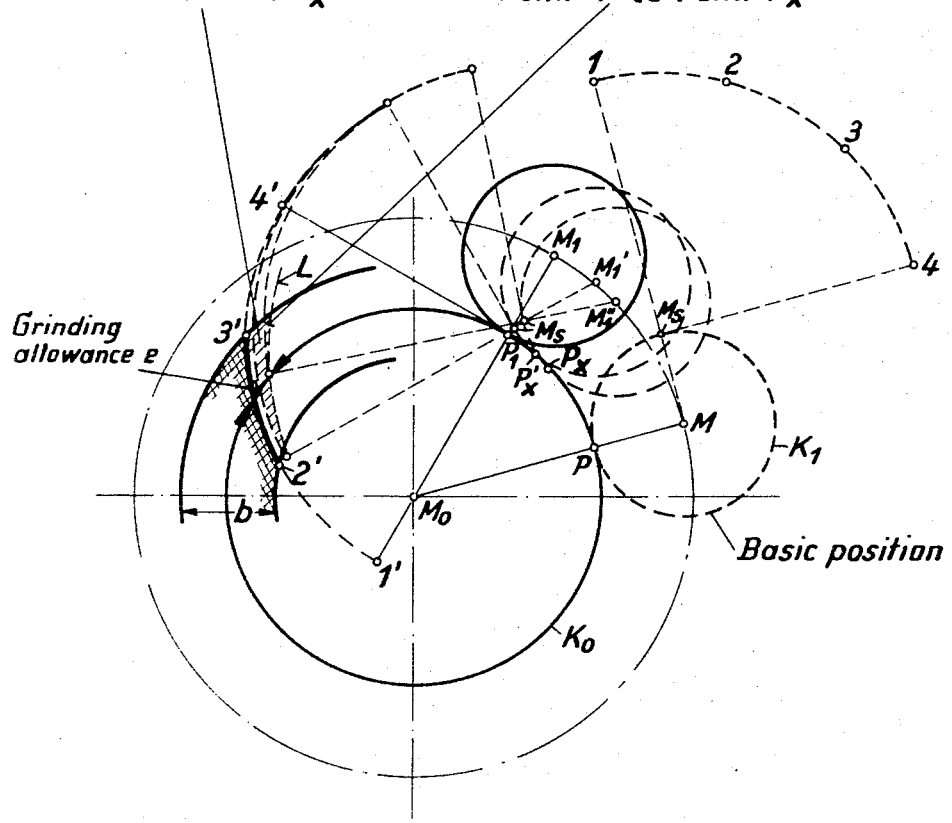
Figure 6:
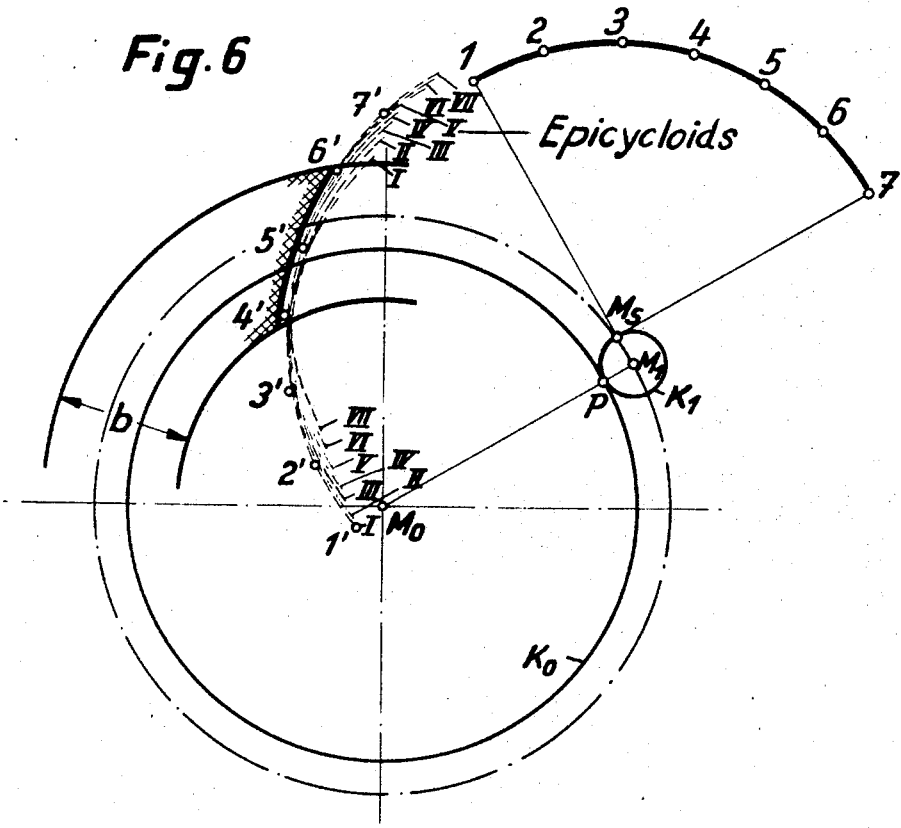
Figure 8:
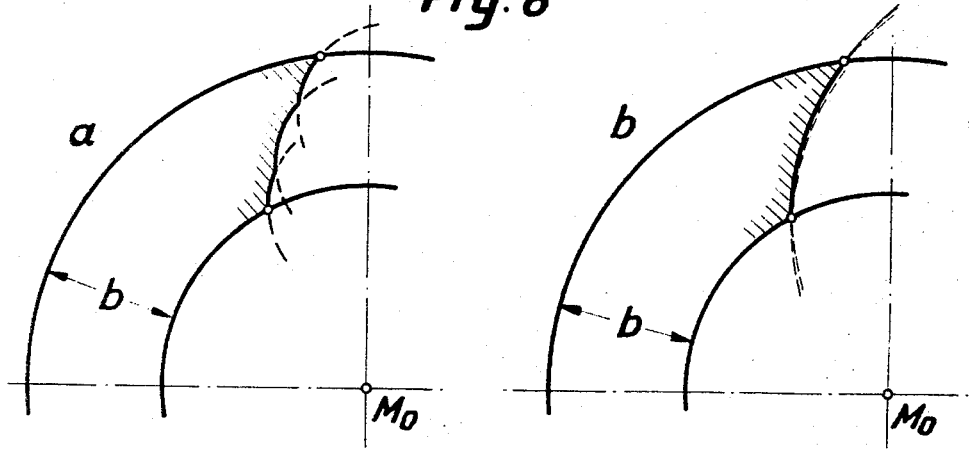
Figure 9:
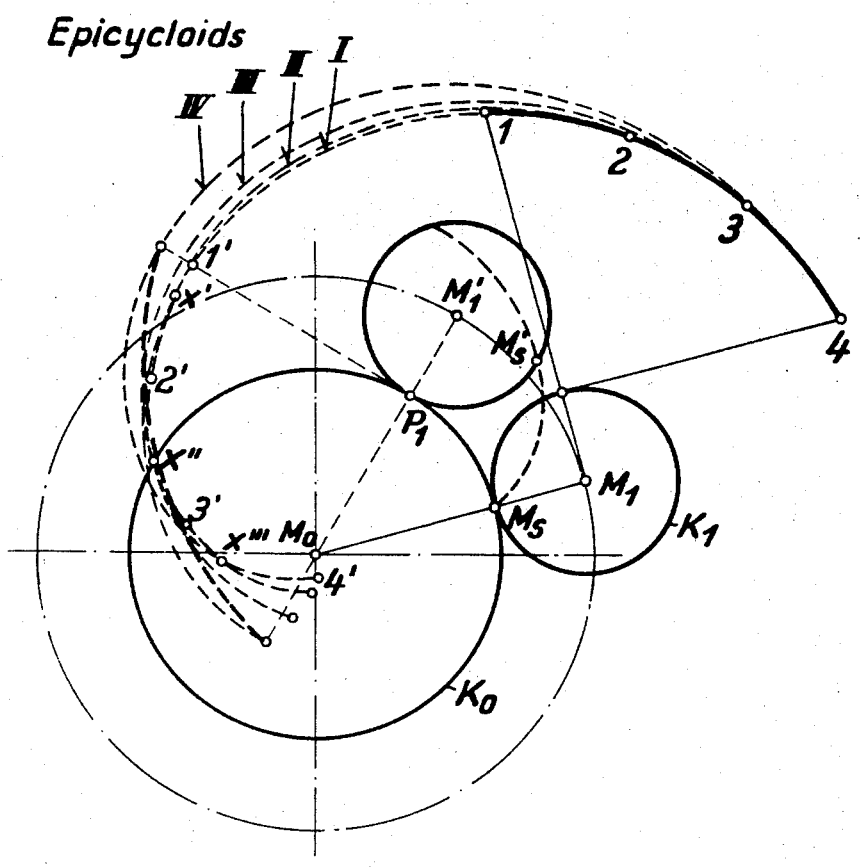
Figure 10:
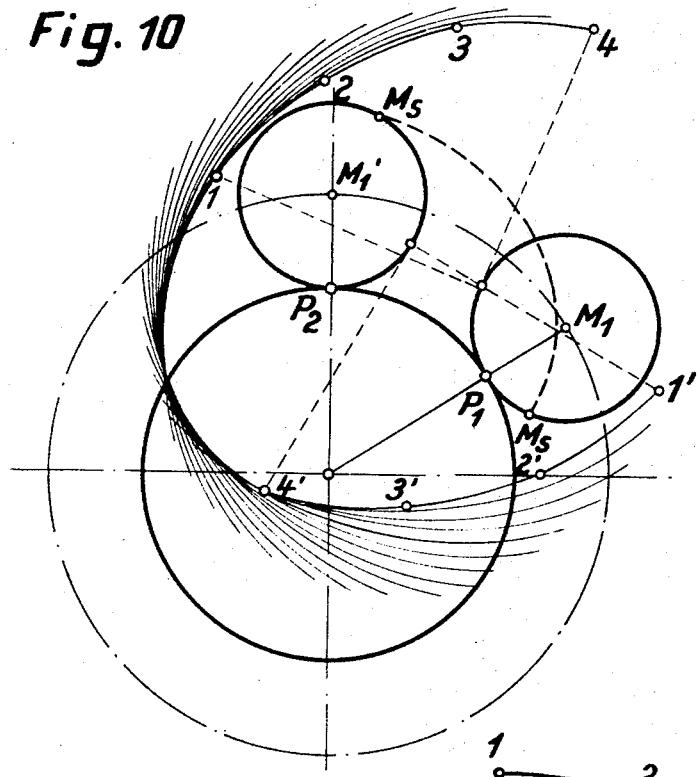
Figure 11:
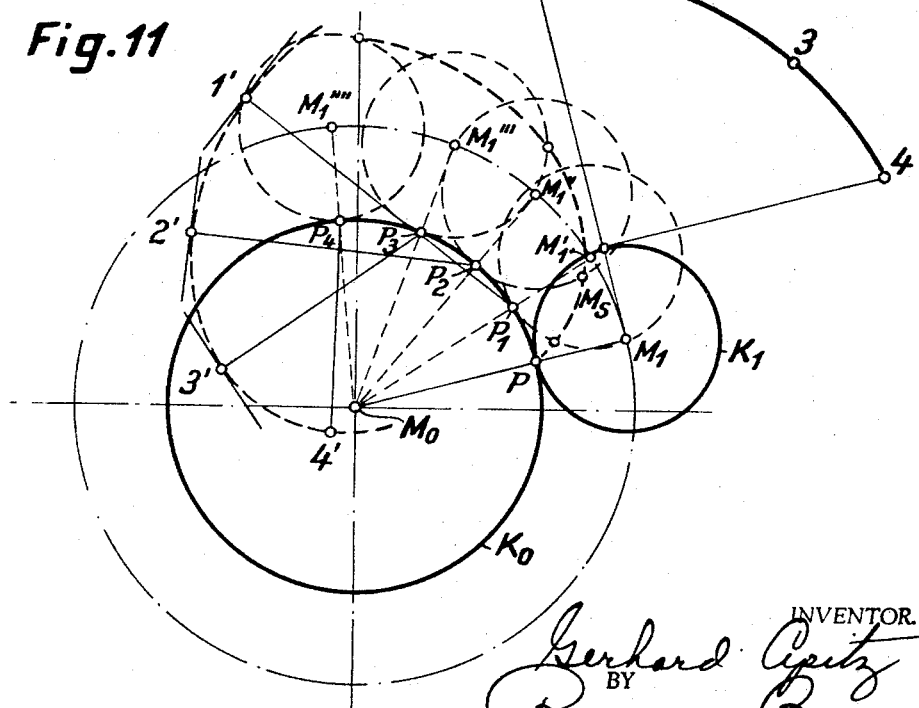
Figure 12:
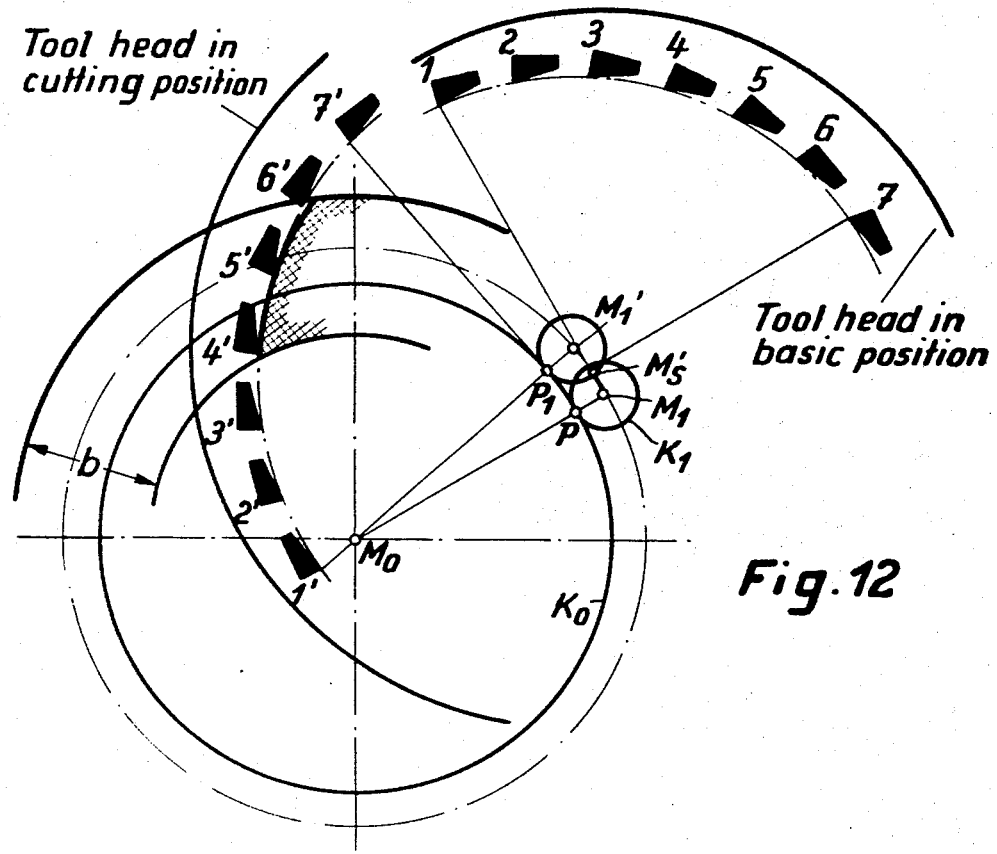
Figure 14:
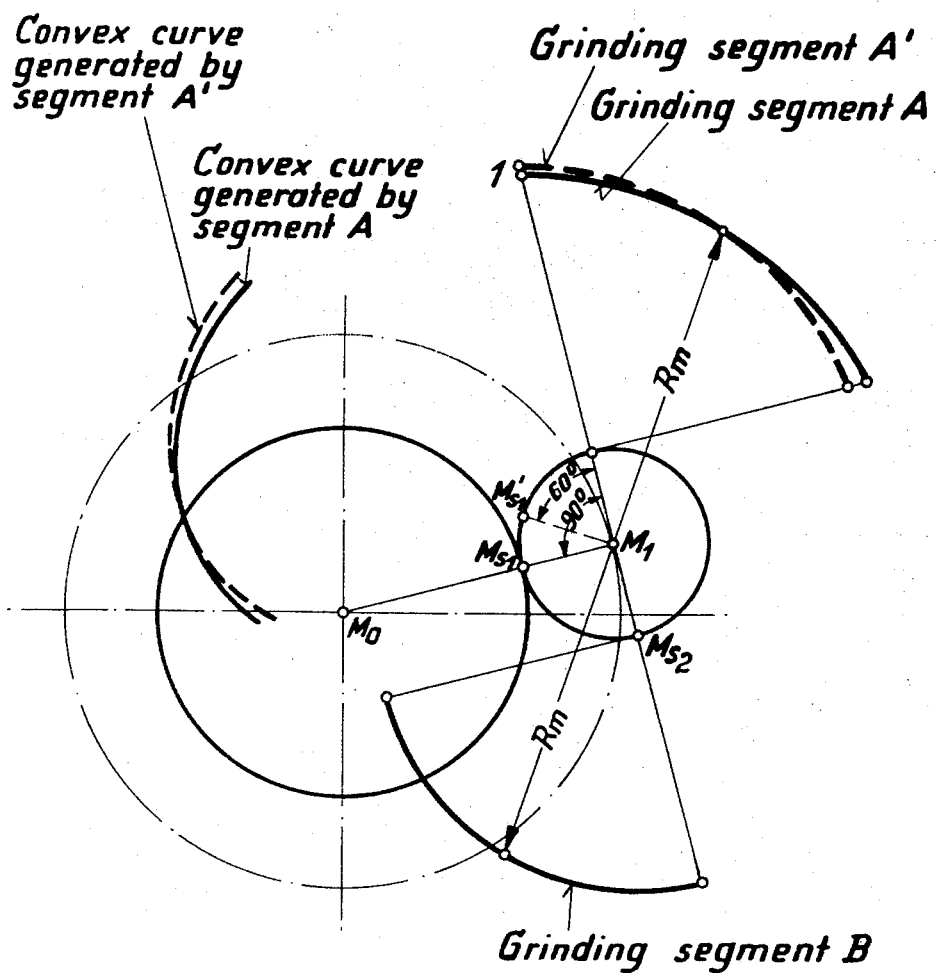
Figure 15:
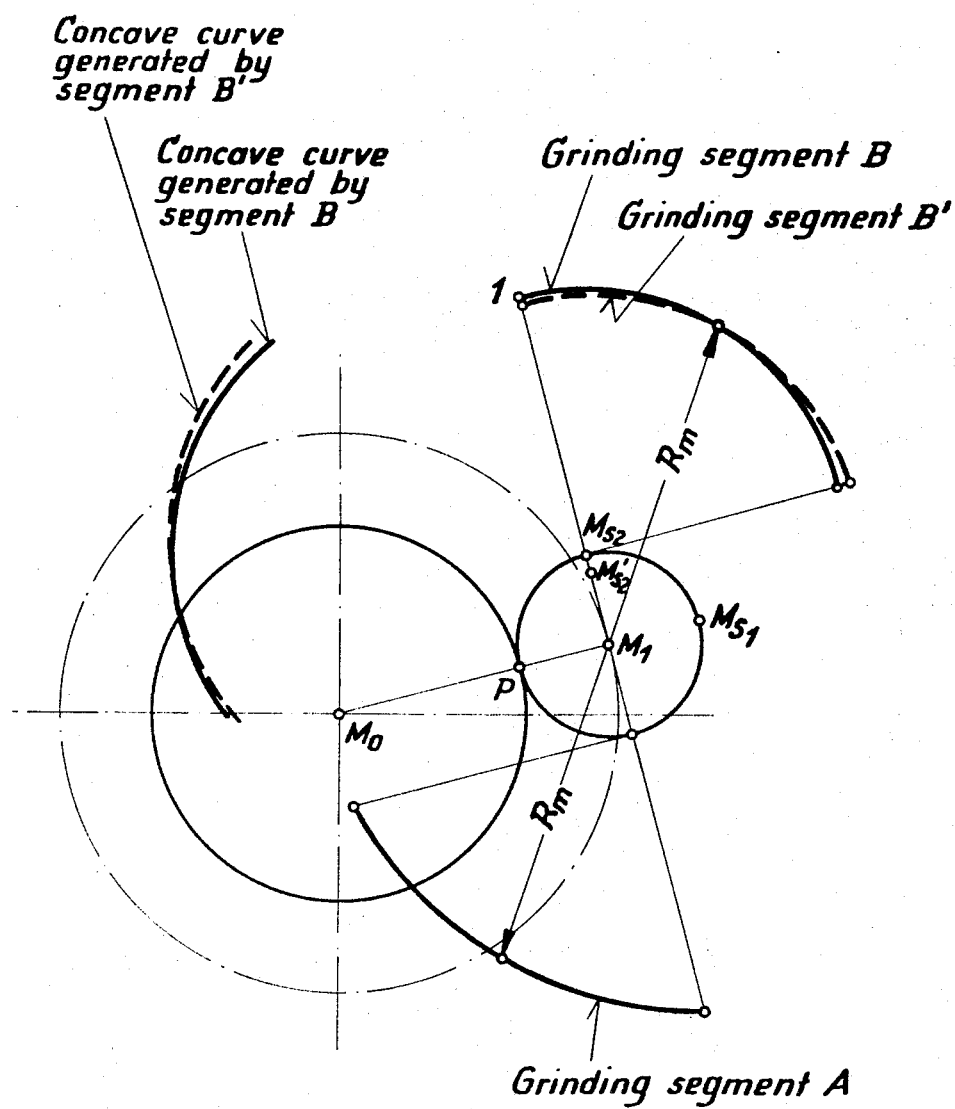
Figure 16:
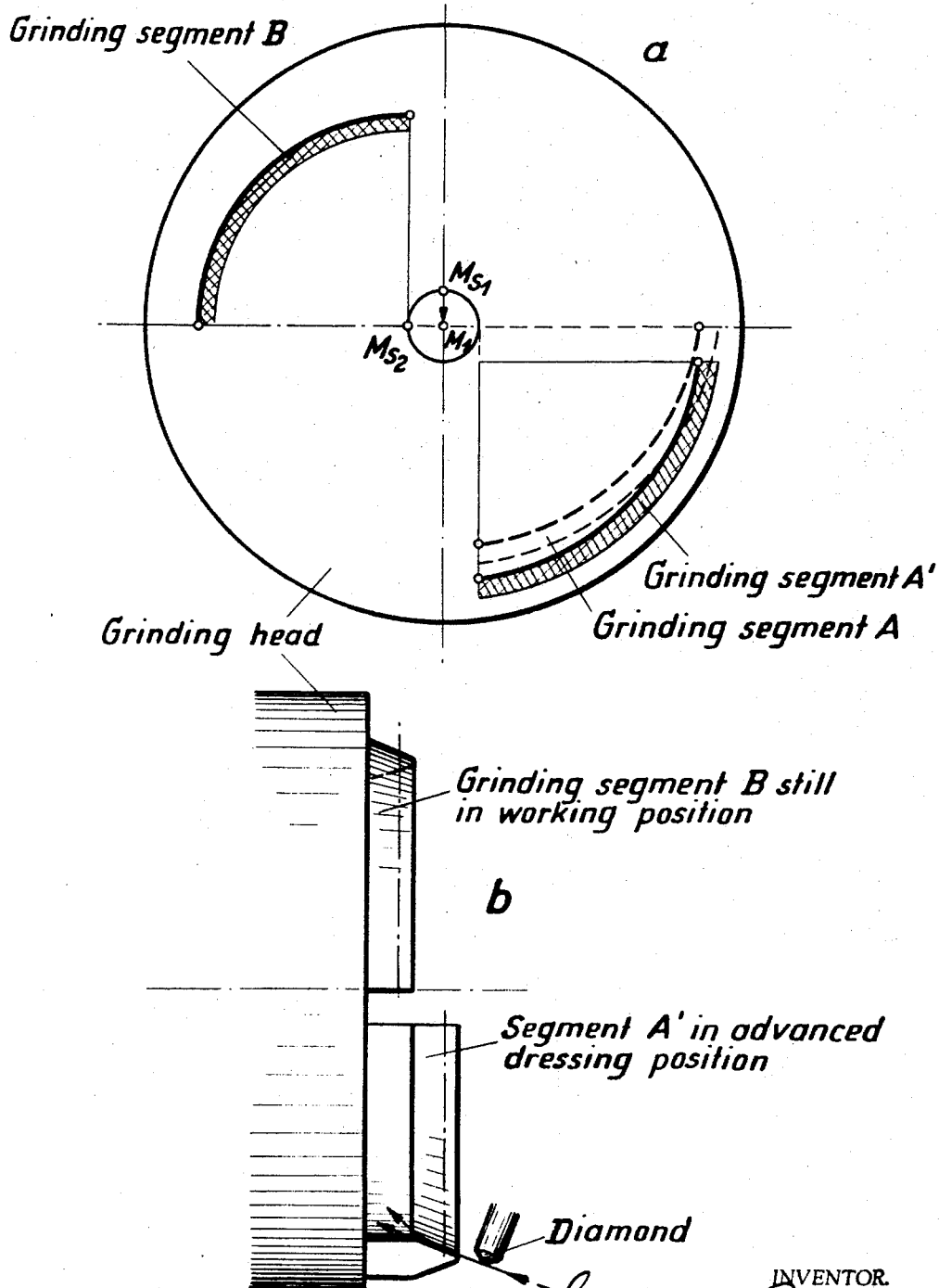
Figure 17:
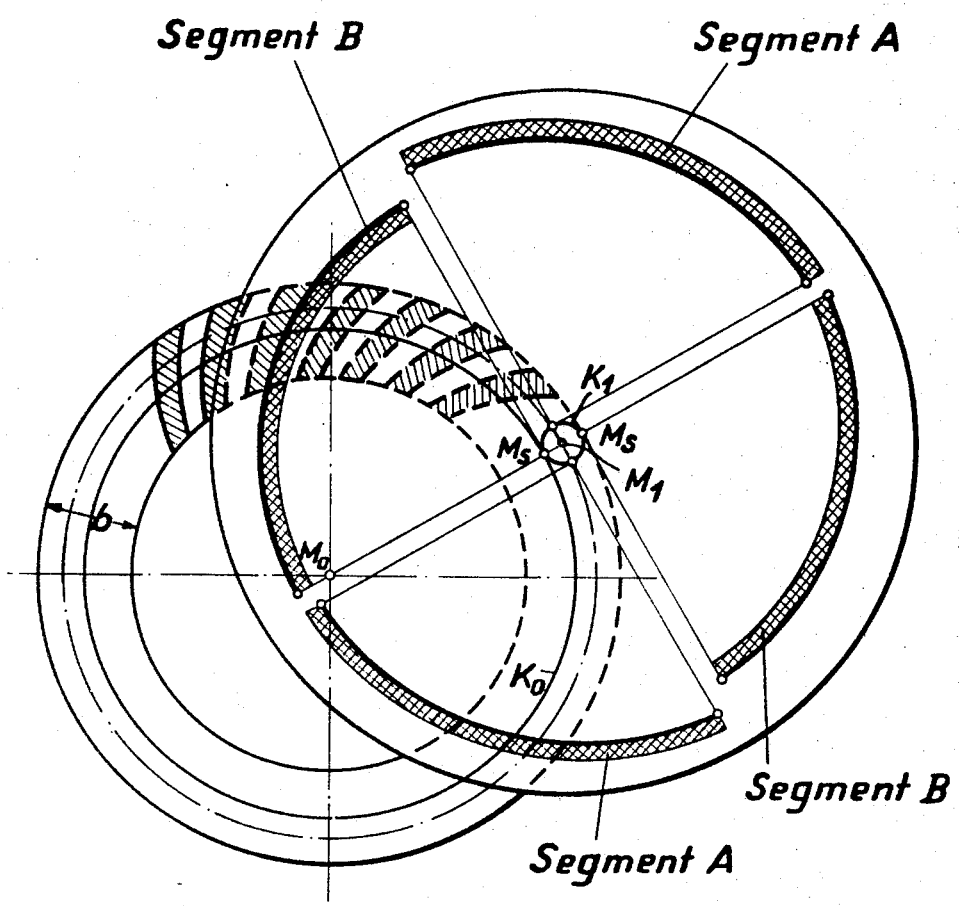
Figure 19:
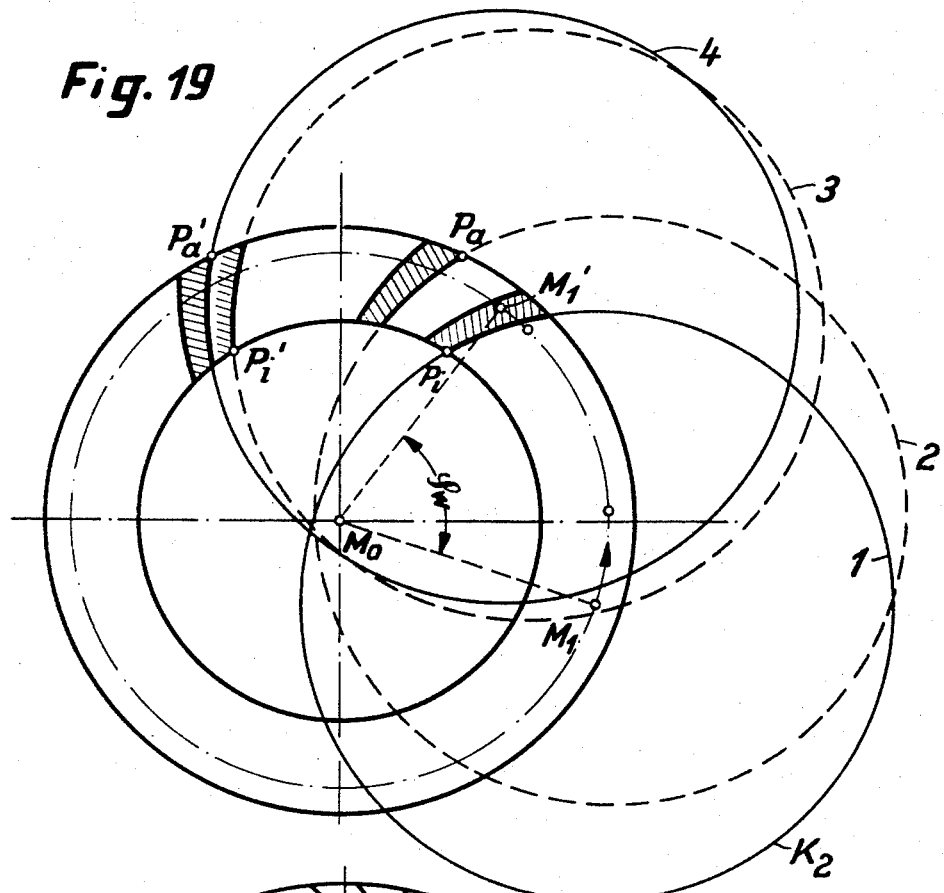
Figure 20:
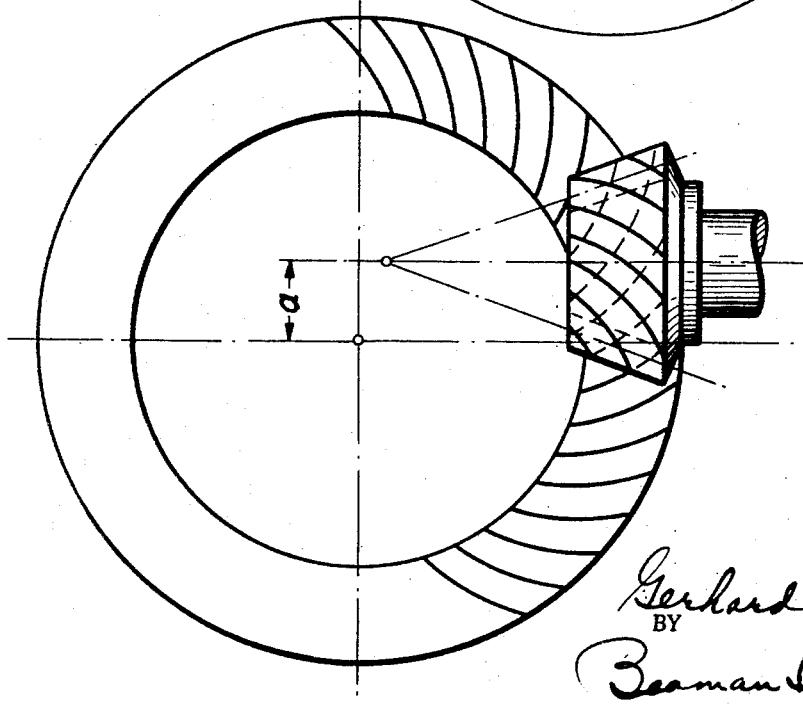
Figure 21:
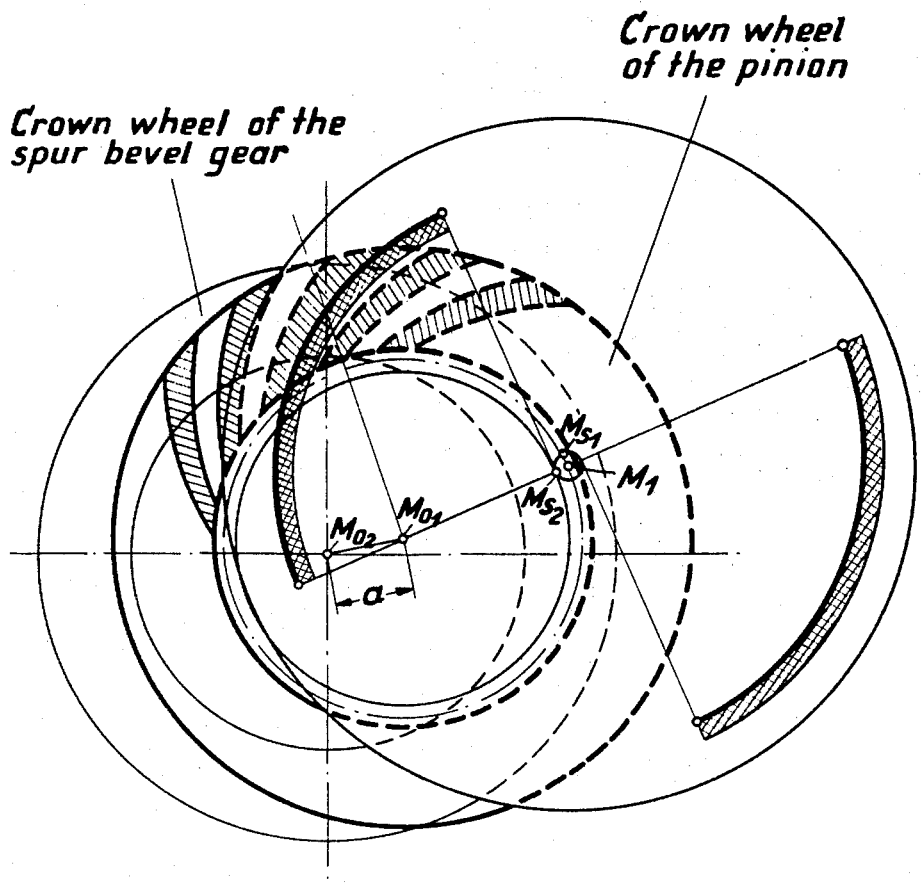

FIG. 4 clearly shows the position of the grinding segment immediately prior and after generating the flank line;

FIG. 5 shows in an exaggerated manner a crown wheel having two teeth wherein the segment portions 1 to 2 and 3 to 4 which are not participating in generating the flank line are used for rough-grinding;

FIG. 6 shows the relations of FIG. 5 for a crown wheel having eight teeth; for the sake of illustration only portions of the arcs I to VII developed by the points 1 to 7 have been shown in the width of the tooth $b$;

FIG. 7 shows a milling tool for generating the concave flank line in accord with the invention;

FIG. 8a shows in an exaggerated manner the flank line composed of epicycloidal curves;

FIG. 8b shows the actual development of the flank line; the deviations from the closed line being hardly measurable;

FIG. 9 shows the development of the convex flank line in an exaggerated manner with a crown wheel having two teeth; for clarity's sake only the arcs of four points of the grinding segment have been shown;

FIG. 10 shows how a closed line of the convex flank is developed out of greater number of epicycloidal curves;

FIG. 11 shows how the flank line is ground from the outside toward the inside;

FIG. 12 shows a milling tool for generating the convex flank, the cutters being arranged on an arc from the center $M_s$; the generated flank line being developed by epicycloidal curves through which the individual cutters move;

FIG. 13a shows in an exaggerated manner the flank line composed of epicycloidal curves;

FIG. 13b shows the true flank line extending as a smooth line;

FIG. 14 shows a single pitch grinding tool; segment A generates the convex and segment B the concave flank;

FIG. 15 shows another possibility of how to influence the convexity; for this purpose the center of the grinding elements is shifted into or out of the rolling circle;

FIG. 16a shows the grinding element shifted out of its working position into the dressing position A';

FIG. 16b shows the grinding segment in an advanced dressing position, and also shows the dressing procedure with profile correction for generating teeth with height convexity;

FIG. 17 shows a double pitch grinding tool;

FIG. 18a shows the position of the wheel, the tool head and the rolling member;

FIG. 18b shows the rolling path necessary to generate the left-hand octoidal tooth flank;

FIG. 19 shows the length of the rolling path required for generating the left-hand octoidal tooth flank;

FIG. 20 shows the production of a pair of bevel gears with their axes in displaced positions in accordance with the method of this invention; and FIG. 21 shows a manner in which a pinion is produced with its axis in a displaced position.

Figure 1:
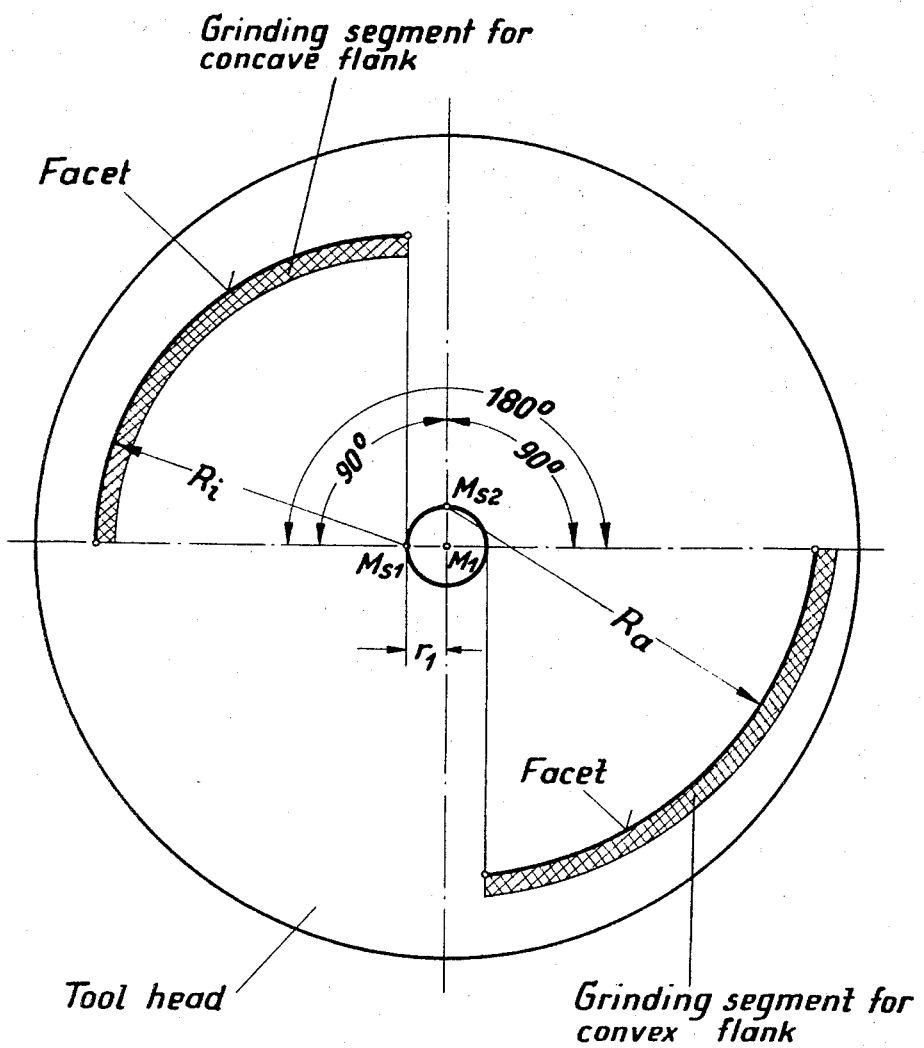
FIG. 1 shows the arrangement of the grinding segments of a single pitch tool with the particular positions of the centers illustrated.

In the method developed according to the invention, circular tools—represented in FIGURE 1 by two grinding segments—are employed, the centres $M_{s1}$ and $M_{s2}$ of which are displaced eccentrically at the distance $r_1$ with respect to the axis of rotation $M_1$ of the tool head. FIGURE 1 shows the arrangement of a single tool in which the grinding segments are off-set through 180° relatively to one another, but their centres $M_{s1}$ and $M_{s2}$ are disposed at such positions relatively to the centre $M_1$ that they enclose an angle of only 90° which, depending on the course of the flank lines, can also be chosen larger. $R_i$ is the radius of the circular grinding segment for the concave flank, $R_a$ is the radius of the circular grinding segment for the convex flank. In the case of a single tool, the gear to be ground turns on by one tooth pitch for each revolution of the tool.

Figure 2:
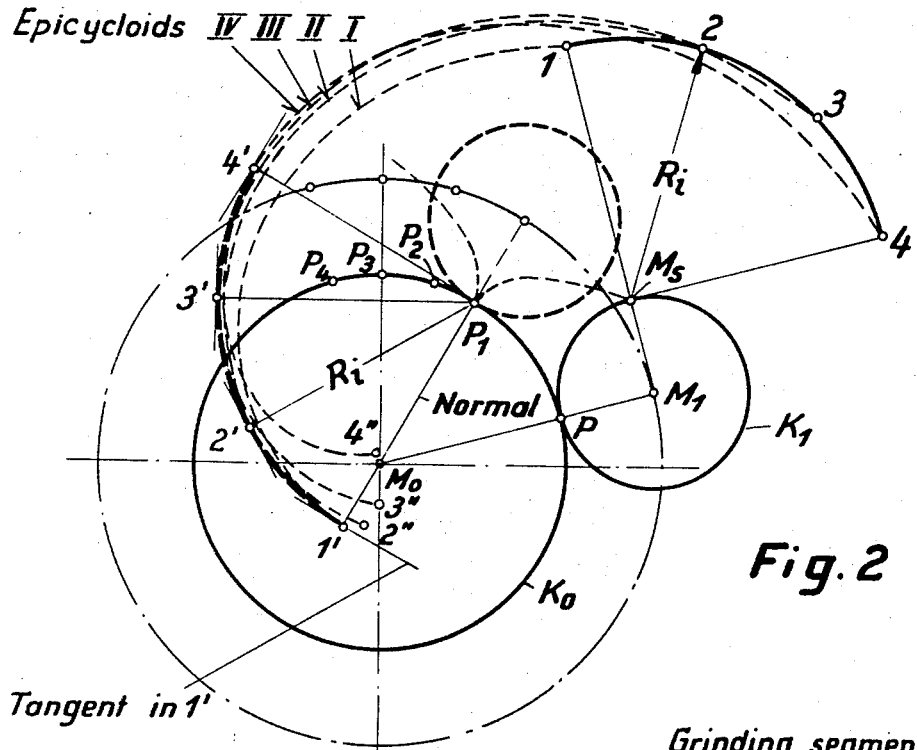
FIG. 2 shows the generation of a concave flank in an exaggerated manner in a crown wheel having two teeth.

The formation of the concave flank line will now be indicated with reference to FIGURE 2. To this end, it has been necessary to assume an extreme case, because with a normal case the lines on the drawing which would have to be examined would run too close to one another and would render graphic illustration impossible. For this reason, a crown wheel in which the number of teeth is two has been used in FIGURE 2, for the purposes of illustration.

In FIGURE 2: $K_0$ is the base circle of the crown wheel having two teeth; $K_1$ is the rolling circle of the grinding head.

The circular grinding segment is indicated by the points 1, 2, 3 and 4 and the centre thereof is located in this case on the rolling circle $K_1$, at the point $M_s$. If the circle $K_1$ rolls on the circle $K_0$, which may be assumed to be stationary, so that the point $M_s$ of the rolling circle $K_1$ reaches the point $P_1$ of the base circle $K_0$, then the point 1 of the grinding segment, which latter is fixed relatively to the rolling circle, will have run through the path of the epicycloid I as far as the point 1'.

In the same way, the points 2, 3 and 4 of the grinding segment would describe the other epicycloids which are designated by the references II, III and IV, as far as the points 2", 3" and 4" if the rolling movement of the circle $K_1$ is carried on as far as the points $P_2$, $P_3$ and $P_4$ on the stationary circle $K_0$.

The intersection of the epicycloids is clearly apparent from FIGURE 2. If however, the rolling movement relatively to the circle $K_0$ is carried out from the point P, only as far as the point $P_1$, then the points 1, 2, 3 and 4 of the grinding segment will be located at the points 1', 2', 3' and 4' of the associated epicycloids. If the tangents to the curve are drawn at the points 1' to 4' and a perpendicular is dropped on to these tangents, all the perpendiculars pass through the point $P_1$.

As the points 1 to 4 of the grinding segment are at the same distance $R_i$ from their centre $M_s$, the points 1' to 4' must also be at the same distance $R_i$ from the point $P_1$, at which the centre $M_s$ now lies.

If not only the paths of the points 1 to 4, but also the paths of the points of the grinding segment which are disposed therebetween were to be followed, then a group of epicycloids arranged so close together would be obtained that the points 1' to 4', together with the intermediate points of the other epicycloids, would give a closed or complete line which is the envelope of all the epicycloid arcs disposed between the points 1' to 4'. As all these points are at the same distance $R_i$ from the point $P_1$, then the envelope 1' to 4' (FIGURE 3) is the generated flank line and constitutes a circular arc about the point $P_1$, which corresponds exactly to the circular arc of the grinding segment.

Figure 3:
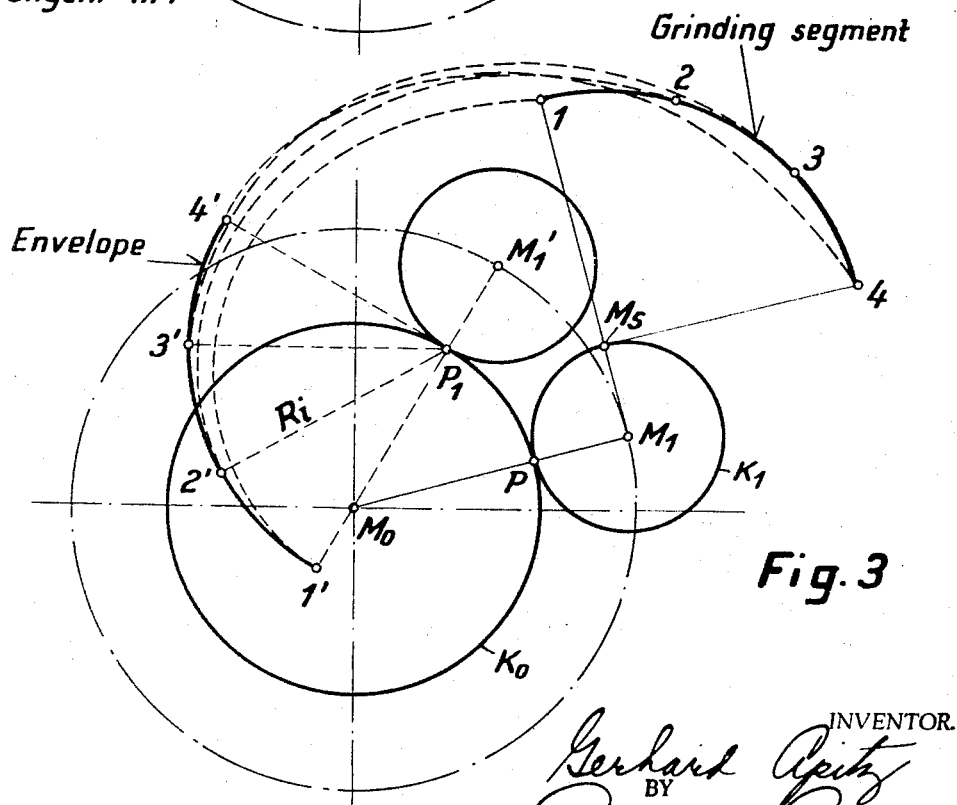
FIG. 3 shows the generated flank line, namely an exact arc with the radius $R_i$ of the grinding segment which is intersected in the moment when the center $M_s$ of the grinding segment reaches the rolling circle $K_0$.

The envelope 1' to 4' in FIGURE 3 is in this case the generated flank line which corresponds in form and length exactly to the circular arc of the grinding segment. Cutting of this flank line 1' to 4' throughout its length by the grinding segment 1 to 4 is completed only at that moment when, during the rolling movement of the circle $K_1$ with respect to the relatively stationary circle $K_0$, the centre $M_s$ of the grinding segment 1 to 4 coincides with the point $P_1$.

It will be seen from FIGURE 4 that the grinding segment 1 to 4 does not touch the flank line 1' to 4' at any point if the rolling movement starting from the point P is not carried as far as the point $P_1$, but only as far as, for example, the point $P_1'$ (position I) or beyond this as far as the point $P_1''$ (position II).

In FIGURES 2 to 4, it has been assumed that the length of the arc of the flank line is equal to the length of the arc of the grinding segment. In reality, the flank line used is considerably shorter. The useful flank line in FIGURE 5 will now be chosen to be the arc between the points 2' and 3', which is determined by the tooth width $b$. Machining of this arc of the flank line between the points 2' and 3', by the same-sized arc of the grinding segment between the points 2 and 3, is completed only when the rolling movement has proceeded as far as the point $P_1$. The distance $e$ between the arc 2', 3' and the dash line L is intended to indicate the assumed grinding allowance per flank.

It will be apparent from FIGURE 5 that, in this extreme case, the arc between the points 1, 2 of the grinding segment will also be used for roug grinding.

If, in FIGURE 5, the rolling movement is carried out from the point P as far as the point $P_x$, then parts of the arc 1, 2 of the grinding segment will have removed the material-portion $e'$. On further rolling as far as the point $P_x'$, the material-portion $e_1$ is ground away by the arc 1, 2 of the grinding segment. If the rolling movement goes beyond the point $P_x'$, then the grinding segment arc 2, 3 also begins to rough-work the flank, machining being completed when this grinding segment arc has rolled as far as the point $P_1$. The grinding segment arc 3, 4 is also used for working the flank. If the rolling movement proceeds beyond the point $P_1$, then it is true that, as shown in FIGURE 4, the arc of the grinding segment lifts away from the flank line, but since, in addition, a rolling movement takes place between the grinding head and the gear, in order to produce the octoid tooth form, as will be made clear hereinafter, the grinding segment arc 3, 4 is called upon to work flank lines which are disposed higher or lower.

Where the conditions as regards the numbers of teeth of the crown wheel are normal—larger than 12—the epicycloids described by the individual points of the tool are so close to one another that graphic representation is impossible. The result of the epicycloids being disposed close to one another in this way, however, is that all the parts of the grinding segment are use for rough-machining and finishing.

FIGURE 6 shows the conditions in the case where the number of teeth of the crown wheel is eight. The grinding segment is represented by the arc 1 to 7. For greater clarity, only the portions of the epicycloids I to VII described by the points 1 to 7 are shown in the region of the tooth width $b$.

The flank line 4' to 6' is generated by the grinding segment arc 4 to 6 and the grinding segment arc 1 to 4 disposed in front of the latter is used for rough grinding, because with the conditions prevailing in the case of a normal gear, the epicycloids are still closer to one another. In the milling of the flank line, cutters are employed instead of the grinding segment, these cutters being likewise mounted on the tool head in an arc located around the centre $M_s$ (FIGURE 7). Each of these cutters, which are arranged at the points 1 to 7, cuts an epicycloid during the rolling movement of the circle $K_1$ relatively to the circle $K_0$, the latter being assumed to be stationary. Since the same conditions as in FIGURE 6, in which the number of teeth of the crown wheel is eight, have been taken as a basis in FIGURE 7, the flank line 4' to 6' would be cut by the cutters arranged at the points 4, 5 and 6, that is to say, the flank line is composed of arcs of the epicycoilds IV, V and VI. The cutters mounted at the points 1, 2 and 3 would operate as rough or preliminary cutters and cut out the tooth space.

FIGURE 8a shows the flank line composed of the epicycloid arcs, which latter are shown with exaggerated curvature. In actual practice, this flank line will be a uniformly curved line, as shown in FIGURE 8b, because the epicycloid arcs will run into one another and their divergence from the continuous line will be scarcely measurable. The number of epicycloid arcs of which the flank line is composed can be varied by means of the number of cutters which are fitted in any particular instance.

The formation of the convex flank line will be described with reference to FIGURE 9.

$K_0$ is again the base circle of the crown wheel, of which the number of teeth is two, and $K_1$ is the rolling circle of the grinding head. The circular grinding segment is represented by the circular arc 1 to 4 and its centre $M_s$ lies on the rolling circle $K_1$ and coincides with the point P of the base circle $K_0$. The angle enclosed by the lines $M_sM_1$ and $M_11$ is 90° in this case. Now, if the circle $K_1$ rolls on the circle $K_0$, which is assumed to be stationary, then the points 1 to 4 of the grinding segment will describe the epicycloids I to IV. The cycloids intersect at the points $x'$, $x''$ and $x'''$. If we regard the line or trace 1', 2', 3' and 4' as the generated flank line, then the latter is composed of arcs of the epicycloids I, II, III and IV, only the epicycloids of the points 1 to 4 of the grinding segment having been considered. In reality, however, the points of the grinding segment which are located between the points 1 to 4 will also describe epicycloids, which are disposed so close to one another that the intermediate points together give the closed or complete trace of the flank line.

FIGURE 10 shows this trace, which has been produced by the rotation of the grinding segment which takes place when the circle $K_1$ rolls from the point $P_1$ to the point $P_2$.

If the tangents are drawn at the points 1' to 4' of the generated flank line and perpendiculars are dropped on to these tangents (FIGURE 11), then these perpendiculars intersect the base circle $K_0$ at the points $P_1$ to $P_4$. At each of the points $P_1$ to $P_4$, there is located the pole of the associated curve point, that is to say, the pole travels from the point $P_1$ to the point $P_4$ during rolling on the circle $K_0$. From this it is apparent that in the case of the convex curve, the individual curve points 1' to 4' are cut in turn from the outside towards the inside, while in the case of the concave curve illustrated in FIGURE 3, all the curve points between 1' and 4' are produced at the same time, if the rolling movement has proceeded as far as the point $P_1$, because $P_1$ is the common pole for all the curve points.

In the milling of the convex curve, cutters are employed instead of the grinding segment, the said cutters being likewise mounted on the tool head in an arc located around the centre $M_s$ (FIGURE 12). If we assume the same conditions as in FIGURE 7, then the cutters in FIGURE 12 which are located at the points 1 to 7 cut the epicycloids I to VII and the flank line 4' to 6' is composed of arcs of the epicycloids II, III and IV.

Figure 13:
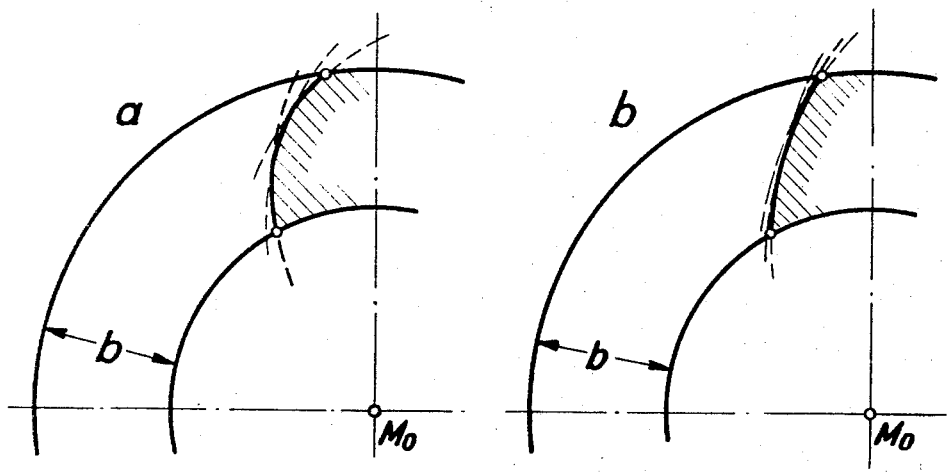

FIGURE 13 shows, in an exaggerated fashion, the flank line composed in this way which, in reality, extends in the form of a smooth curve, as shown in FIGURE 13b, because in gears of normal design in which the number of teeth of the crown wheel is larger, the epicycloids run smoothly into one another. The number of epicycloid arcs of which the flank line is composed can be varied by fitting a greater or lesser number of cutters.

*Corrections*

FIGURE 14 shows a single grinding tool. The grinding segment A generates the convex curve and the grinding segment B is intended for the concave curve. The radius $R_m$ is of the same length in both segments.

The amount and position of the convexity on both flanks can be calculated in advance.

The position of the convexity can be varied in two ways.

(1) By varying the inclined position of the convex curve. In FIGURE 14, the centre $M_{s1}$ of the grinding segment A for the convex curve lies on the rolling circle $K_1$ and it is off-set through 90° with respect to the line $M_11$. The convex curve shown by the solid line is cut with the segment A. If instead of the segment A, there is used the segment A', the centre $M'_{s1}$ of which, it is true, is on the rolling circle $K_1$ but off-set through only, for example, 60° with respect to the line $M_11$, then the segment A' cuts the convex curve shown by a dash line, which curve is thereby given a different inclined position, whereby the position of the convexity is also altered.

(2) By shifting the centres of the grinding segments towards the inside or the outside of the rolling circle $K_1$. A different inclined position of the convex or concave curve is obtained if the centre $M_s$ of a particular segment is arranged, not on the rolling circle $K_1$, but inside or outside the latter. The position of the flank convexity is changed at the same time. In FIGURE 15, the centre $M'_{s2}$ of the grinding segment B' lies inside the rolling circle $K_1$ and the segment generates the concave curve shown by a dash line. On the other hand, the concave curve shown by a solid line would be produced by the segment B, which latter is shown by a solid line and the centre $M_{s2}$ of which lies on the rolling circle $K_1$.

*Dressing of the grinding segments*

To dress the grinding segments, they are shifted so that their centres $M_{s1}$ and $M_{s2}$, respectively, are located at the centre $M_1$ of the grinding head and the particular segment which is to be dressed is at the same time placed forward. In FIGURE 16a, the segment A shown by dash lines and arranged eccentrically with respect to the centre $M_1$ has already been displaced into the position A' concentric with $M_1$ and FIGURE 16b shows the segment in the advanced position ready for dressing. On completion of the dressing operation, during which the diamond is shifted in the direction of the arrows, the segment is again brought into the eccentric grinding position and the same occurs with the segment B.

If, during the grinding of the flanks, a vertical convexity is to be obtained at the same time, then the diamond must perform the longitudinal movement indicated by the dash line in FIGURE 16b.

Whether the dressing of the grinding segments, as described hereinbefore, is effected on the machine, or whether the segments are removed from the grinding head and dressed on a separate dressing device is a matter of practical convenience.

*Multiple tools*

A single tool has been taken as a basis in the explanation given so far. However, multiple milling and grinding tools can also be employed. The lengths of the segments are then determined according to the multiple nature and the nature of the teeth to be cut.

For example, FIGURE 17 shows a double grinding tool. The segments A work the convex flanks and the segments B work the concave flanks. During one revolution of the tool head, the gear will move on by two tooth pitches.

*Completion of rolling*

It has only been shown so far how the concave and convex flank line are generated. However, the tooth profile (e.g. an octoid) has not yet been produced thereby. In order that the tooth profile may be formed, the rolling member with the tool head mounted thereon has still to perform an additional rolling movement about the axis of the rolling member (FIGURE 18a). In FIGURE 18a, the gear is shown in section and the position of the tool head and of the rolling member is shown. FIGURE 18b shows the rolling path which is necessary for completing the rolling of, for example, the left-hand outer tooth profile. Upon commencement of the rolling operation, the tool cuts at the tip of the tooth and during the rolling operation the other parts of the profile are machined. It can be seen from FIGURE 19 how long the rolling path for completing the rolling of the left-hand tooth flank must be. The tool head $K_2$ begins the machining of the inner profile at the point $P_i$, when in the position 1 shown by a solid line. The tool head $K_2$ is now moved round the centre $M_0$ to the left by the rolling member with radium $M_1M_0$. In the position 2, the tool head begins to machine the outer profile at the point $P_a$. In the position 3, the rolling movement corresponding to the inner profile has been completed, at the point $P_i'$, and in the position 4 all the rolling for the left-hand flank has been completed, at the point $P_a'$. In the process, the tool head $K_2$ has moved to the left through the angle $\varphi_w$ about the centre $M_0$ with the radius $M_1M_0$.

To complete the rolling of the right-hand flank, the same rolling path is required, but the two paths are off-set by half a tooth pitch with respect to one another, so that the total rolling angle is somewhat larger than $\varphi_w$. The additional rolling movement must be superimposed on the speed of the gear.

*Working time*

Milling can be carried out in the same working time as is already required by other known methods. The milling time is affected by the multiple nature of the tools and by the cutting speed used.

The grinding of the flanks is egected by the method of the invention in working times which it has not been possible to achieve heretofore.

The actual grinding time for a gear having an average standard modulus of 2.62 mm., 31 teeth and a tooth width $b=20$ mm. is 0.6 minute per rolling pass, at a grinding speed of 25 m./sec. with 4,000 r.p.m. of the grinding tool, using a double tool. In this time, all 31 teeth are ground once. If six rolling passes are required, then the actual grinding time for the gear is 3.6 minutes.

*Displaced-axis bevel gears*

Bevel gears with displaced axes, that is to say, bevel gears which engage with their respective axes extending in planes which are spaced apart, as shown in FIGURE 20, can also be milled and ground by the method described above. In this case, for example, the spur bevel gear is produced in the above-described manner, as shown in FIGURE 17, while the pinion is cut with its axis in a displaced position, in accordance with FIGURE 21. The angles of engagement of the tool for the pinion must be adapted to the meshing conditions, which are altered in such a case.

What I claim is:

1. The method of forming arcuate gear teeth each having a convex flank and a concave flank upon a bevel gear having an axis wherein the gear is adapted to rotate about its axis and a machining edge mounted upon a tool head rotatable about a first axis, comprising the step of simultaneously rotating the tool head about its first axis while rotating the tool head first axis about a second axis so that the machining edge is moved through an epicycloidal path, and engaging the machining edge to the gear while moving through said epicycloidal path to define an arcuate gear tooth flank.

References Cited

UNITED STATES PATENTS

| | | | |
|---|---|---|---|
| 1,612,371 | 12/1926 | Gleason et al. | 51—33 |
| 1,622,555 | 3/1927 | Wildhaber | 90—5 |
| 1,815,336 | 7/1931 | Shlesinger et al. | 51—90 |
| 2,063,492 | 12/1936 | De Leeuw | 51—287 X |
| 2,100,705 | 11/1937 | Wildhaber et al. | 51—287 |
| 2,145,000 | 1/1939 | Wildhaber | 90—5 |
| 2,839,873 | 6/1958 | Baxter | 51—33 |

LESTER M. SWINGLE, *Primary Examiner.*

U.S. Cl. X.R.

90—5